Jan. 20, 1942.  J. D. LANGDON  2,270,838
SIPHON BREAKER AND VALVE
Filed March 26, 1940
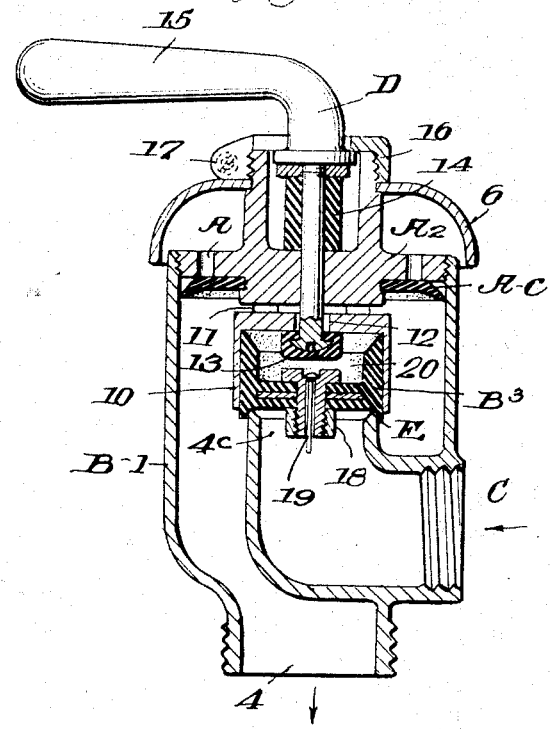
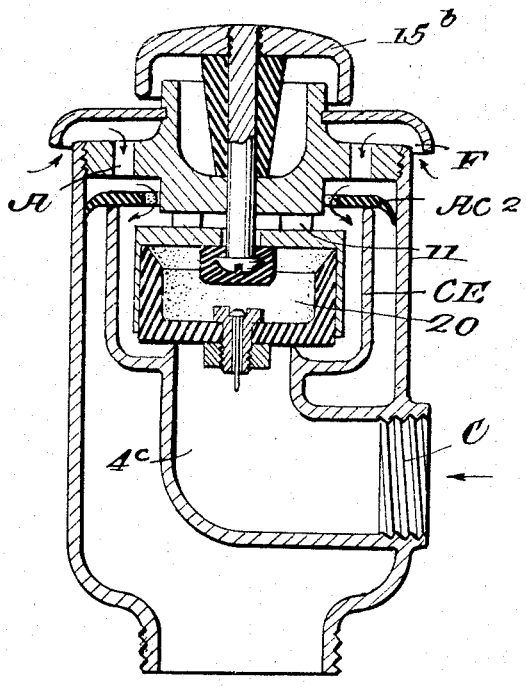
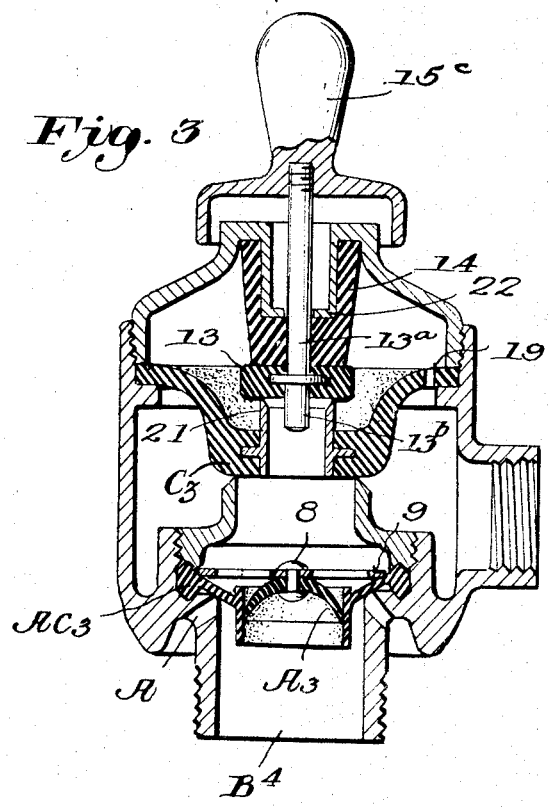
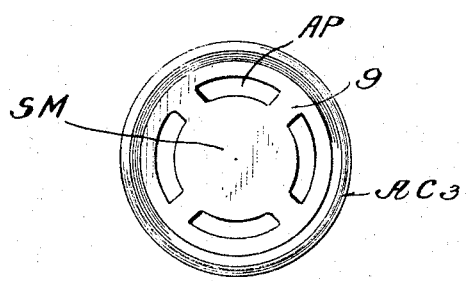
J. D. Langdon, Inventor Patented Jan. 20, 1942

2,270,838

UNITED STATES PATENT OFFICE 2,270,838

SIPHON BREAKER AND VALVE

Jesse D. Langdon, Los Angeles, Calif., assignor to Eureka Vacuum Breaker Corporation, Kings County, N. Y., a corporation of New York Application March 26, 1940, Serial No. 326,090

4 Claims. (Cl. 137—93)

This is a continuation in part of application Serial No. 294,840, filed September 14, 1939, for Siphon breakers and valves, now Patent No. 2,211,212, of August 13, 1940.

My invention relates to siphon breaking valves for the prevention of back siphonage of liquid into the supply line to which said valves are attached when a vacuum prevails in said supply line.

My invention has for its objects and purposes the provisions of three modifications of similar elements combined in such a manner that several distinct inventions are dependent upon each other and mutually contribute to produce a single result.

Another object is to combine a siphon breaking device with a valve as an integral valve and siphon breaking unit.

A further object is to provide similar parts capable of use in either a separate siphon breaking device, or an integral control or pressure operated valve and siphon breaker. Other and further objects and purposes will appear as the specification proceeds and the operation of the invention is described as shown by the drawing which is for the purpose of illustration only, as it is specifically understood that the organization of the structure used in reduction to practice may be changed within the scope of what is claimed.

Of the drawing:

Figure 1 is a sectional view of a complete flush valve having an integral siphon breaker built into the body thereof.

Figure 2 is an alternative structure as of Figure 1 with an enlarged upwardly projecting valve seat extension C—E supporting a modified annular check A—C—2.

Figure 3 is a pressure controlled valve integral with a siphon breaker and is a modification of Figures 1 and 2.

Figure 4 is a plan view of spider 9 and annular member A—C—3.

Figure 1 of the drawing illustrates a complete flush valve having combined therewith almost identical equivalent elements of the other two forms of siphon breaker hereof shown as an integral part of the flush valve structure, making the flush valve itself inherently a siphon breaker. The body C2 of the siphon breaker unit B1 is the built-in equivalent of 2 and B2, Figs. 1 and 4 of the original application 294,840, and the spider A2 of Figs. 1 and 4 and Fig. 1 of this continuation are practically identical in form near their outer periphery, the passages A being provided in relatively the same position as of all the figures. A cylinder 10 having a closed end depends from legs 11 in turn depending from a spider A2, a port 12 being provided through the closed end of the cylinder 10. A relief valve 13 extends across the port 12 and has a stem extending upwardly and guided through the center of spider A2. A rubber sleeve 14 surrounds the stem of the relief valve 13 the upper end thereof having a flange threadedly attached thereto. A handle 15 has a flanged end portion which impinges the flange on the upper end of the relief valve stem 14. A split cowl retaining ring 16 is disclosed on a tubular portion extended upwardly from spider A2 and surrounding the stem of relief valve 13. The rubber sleeve 14 rests on the center of spider A2. The split cowl retaining ring 16 is extended laterally at the split portion to permit a screw 17 to be inserted and adjusted transversely of the ring 16 for the purpose of drawing the retaining cowl ring 16 together in order to hold the handle in any desired position. The handle 15 is flattened at point D and the opening in the top of the cowl ring 16 is slotted to correspond with the shape of the portion D so that the handle 15 cannot turn inside of the cowl retaining ring 16, thus holding the handle in any desired position. The rubber piston B3 is molded about a metal core 7 and has a tubular portion extending into cylinder 10 and against the inside wall of pressure chamber 20. A metal central portion 18 with a bypass 19 extends through the head of piston B3. The pressure chamber 20 is formed between the closed end of the cylinder 10 and the upper side of the piston B3, the head of which forms a valve portion adapted to seat across the inlet seating portion 4c of inlet port C.

When the described valve B1 is attached to a water line the water flows inwardly through port C and upwardly against the valve member formed by piston B3. Water passing through bypass 19 into pressure chamber 20 closes the valve because a greater area of the piston B3 is exposed to pressure built up via bypass 19, on the upper side of the piston than on the lower side. When the end of handle 15 is pressed downwardly the relief valve 13 is raised from its seat across the port 12 and the piston is forced upwardly by water entering through inlet C, thus starting a new cycle of operation for the valve.

The modification as of Figure 2 operates substantially the same as Figure 1, but has added to the structure thereof, a seat extension C—E which has normally resting thereon valve member A—C—2 preferably made of rubber-like material or may be made of any suitable material to allow functioning and make a leak-proof seat.

When liquid is flowing through the valve and rises into extension C—E the member A—C—2 is forced upwardly across the air inlet openings A to prevent leakage of liquid from the body BI. In case a vacuum is created via inlet C the member AC—2 is rested on the upper rim of extension C—E and atmospheric pressure enters the extension C—E following the course indicated by arrow F thence through inlet C breaking any vacuum created via inlet 3. The body B—I of the valve is open to the ingress of air at all times except when liquid is passing through the valve. The outer periphery of annular member AC—2 is guided by the inner wall of the body BI and if made of soft rubber-like material the outer periphery of member AC—2 may be expanded against the inner wall of body BI by liquid pressure. On the other hand, if the annular member AC—2 is of hard material it must be inserted to clear inside of body BI so it will be capable of a reciprocating movement within the barrel formed by the body BI.

The modification of Fig. 3 also has like numbers and characters as of Fig. 1. Indicating like parts in Figs. 1, 2 and 3, bell check A3 and the annular check valve member AC—3 which registers with the air passage or openings A of the air inlet tube formed by the body B—I of Fig. 1 and Fig. 2. The modification illustrated in Fig. 3 has the air inlet element A disposed around outlet extension B—4, liquid flowing through said outlet extension B—4 forces annular member AC—3 downwardly across the air inlet element or ports A of outlet extension B4.

When operating button 15C of Fig. 3 is moved laterally in any direction, the stem 13a of relief valve 13 is fulcrumed laterally against the washer 22 causing the relief valve extension 13b to tip laterally and, due to its engagement with the end of seat member 21 extending upwardly around relief port 12a through flexible diaphragm valve member C3, will tip seat member 21 and diaphragm valve member C3, relieving the pressure chamber 20 causing the valve to open. The valve closes in the usual manner by water entering through bypass 19.

The plan Fig. 4 illustrates a solid metal center SM which acts as a valve closure element in place of the bell member A3. Vacuum exerted from the upper side pulls annular member AC3 against the outer edge of the solid central portion SM making an aperture check valve, subject to being opened by fluid flowing in one direction and closed by fluid flowing in the opposite direction through apertures AP.

Having described my invention and illustrated various adaptations to practice to aid those versed in the art to build and use the same, I claim:

1. A siphon breaker and valve comprising a casing having an inlet conduit and outlet opening and air vents communicating with a passage formed by the casing between said inlet conduit and outlet opening and around a cylinder with an open end having attaching means extended from the inside of said casing suspending said cylinder in said passage, the inner end of said inlet conduit and the open end of said cylinder facing one another, a piston forming one side of a pressure chamber in said cylinder and seating on the inner end of said inlet conduit, a bypass communicating between said inlet conduit and pressure chamber, an exhaust port communicating between said pressure chamber and passage, an annular valve member held in position by supporting means within said casing and lying in concentric relationship to said casing and cylinder and capable of being urged by fluid pressure within said passage to close said air vents, said annular valve member capable of being moved by atmospheric pressure to open said air vents when vacuum is exerted within said passage, said air vents being located in the wall of said casing surrounding the suspending means of said cylinder and on a level above said cylinder.

2. A device as defined by claim 1 wherein the supporting means for said annular valve member is formed by a groove surrounding a portion unitary with the casing and in line with the cylinder.

3. A device as defined by claim 1 wherein the suspending means for the annular valve member is constituted by an extension from the inner end of the inlet conduit whereby pressure fluid flowing thru the inlet conduit will urge said annular valve member in a direction to close the air vents.

4. A device as defined by claim 1 wherein the casing is designed to stand in an upright working position having the inlet conduit disposed thru the side of a cylindrical portion of the casing, the air vents located above the inlet conduit, and the inlet conduit being in the form of an elbow with the inner end opening toward the piston in the cylinder and the casing outlet taking off from the cylindrical portion lying concentric with the inner end of the inlet conduit, the piston and the cylinder whereby gravity will evacuate the casing of fluid within the passage formed between the inlet conduit and the outlet by the wall of the casing.

JESSE D. LANGDON.